United States Patent [19]

Li

[11] Patent Number: 5,345,054
[45] Date of Patent: Sep. 6, 1994

[54] ARC SHIELD FOR USE IN PROJECTION WELDING

[75] Inventor: Chun-Tang Li, Kaohsiung Hsien, Taiwan

[73] Assignee: Chun Yu Works & Co., Ltd., Taiwan

[21] Appl. No.: 51,680

[22] Filed: Apr. 23, 1993

[51] Int. Cl.⁵ .............................. B23K 9/20
[52] U.S. Cl. ..................................... 219/98
[58] Field of Search .................... 219/98, 99

[56] References Cited

U.S. PATENT DOCUMENTS

| | | | |
|---|---|---|---|
| 2,878,363 | 3/1959 | Shoup et al. | 219/99 |
| 3,037,109 | 5/1962 | Glover | 219/99 |
| 3,182,173 | 5/1965 | Dash | 219/99 |
| 3,291,438 | 12/1966 | Logan | 219/99 |
| 4,117,297 | 9/1978 | Sholle | 219/98 |
| 4,214,144 | 7/1980 | Spiegelberg | 219/99 |

Primary Examiner—Clifford C. Shaw
Attorney, Agent, or Firm—Cushman, Darby & Cushman

[57] ABSTRACT

An arc shield is used in projection welding. The projection welding is performed for welding the lower end of a metal stud to the upper surface of a metal plate. The stud has a head and a stem connected securely to the central portion of the lower surface of the head. The arc shield includes an annular horizontal top wall defining a hole therein, and an annular vertical side wall having an annular top end connected securely to the outer peripheral portion of the top wall, and an annular bottom end having a plurality of notches. The annular side wall defines a chamber therein. The hole of the top wall has a size slightly greater than the diameter of the stem of the stud so as to allow for extension of the stem of the stud into the chamber through the hole of the top wall. When the projection welding is being performed, the electric arc is enclosed within the arc shield, while the surplus gas and molten metal that occur in the chamber flow from the arc shield through the notches of the annular side wall.

2 Claims, 3 Drawing Sheets

ARC SHIELD FOR USE IN PROJECTION WELDING

BACKGROUND OF THE INVENTION

1. Field of the Invention

This invention relates to an arc shield for use in projection welding, which encloses the electric arc therein.

2. Description of the Related Art

In the architectural art, a metal stud is often used in projection welding to couple a steel member or a plurality of steel members with a concrete layer. Referring to FIG. 1, a metal stud (1) is welded to an H-shaped steel member (3) and is embedded within a concrete layer (5). Referring to FIG. 2, in order to weld the lower end of the vertical cylindrical stem (1A) of the stud (1) to the upper surface of the top plate of the steel member (3), a generally semicircular metal filler (11) is attached to the lower end surface of the stem (1A) of the stud (1). A welding gun (2) holds the horizontal head (1B). When an electric current is applied to the stud (1) from the welding gun (2), an electric arc is created between the stud (1) and the steel member (3). Accordingly, molten weld metal (12) is produced between the stud (1) and the steel member (3). Solification of the molten weld metal (12) welds the stud (1) to the steel member (3).

Referring to FIG. 3, in order to weld a plurality of steel members (3') (only one is shown) to a concrete layer (not shown), a metal coupling plate (6) is provided so as to weld the steel members (3') thereto. The coupling plate (6) is coupled with the concrete layer by a stud (1') and a welding gun (2') in the same manner as the steel member (3) of FIG. 1.

The above-mentioned welding process suffers from the following disadvantages:

(1) If no arc shield is used, the electric arc may damage the eyes of the operator;

(2) When the operator holds an arc shield with one hand, it is difficult with one-hand operation to accurately position the stud on the steel member. Furthermore, it is time-consuming to perform this one-hand operation.

(3) Because the molten weld metal is exposed to the atmosphere during welding, dust may enter therein, thus forming bubbles in the solidified weld metal. The bubbles reduce the tensile strength of the solidified weld metal.

SUMMARY OF THE INVENTION

The main object of this invention is to provide an arc shield for use in projection welding, which encloses the electric arc therein.

According to this invention, an arc shield is used in projection welding. The projection welding is performed for welding the lower end of a metal stud to the upper surface of a metal plate. The stud has a head and a stem connected securely to the central portion of the lower surface of the head. The arc shield includes an annular horizontal top wall defining a hole therein, and an annular vertical side wall having an annular top end connected securely to the outer peripheral portion of the top wall, and an annular bottom end having a plurality of notches. The annular side wall defines a chamber therein. The hole of the top wall has a size slightly greater than the diameter of the stem of the stud so as to allow for extension of the stem of the stud into the chamber through the hole of the top wall. When the projection welding is being performed, the electric arc is enclosed within the arc shield, while the surplus gas and molten metal that occur in the chamber flow from the arc shield through the notches of the annular side wall.

Preferably, the top wall includes an annular neck projecting upward therefrom. The hole is formed through the neck. Accordingly, the length of the hole is increased so as to prevent the stud from moving relative to the metal plate just before welding, thereby allowing for positioning of the stud on the metal plate.

BRIEF DESCRIPTION OF THE DRAWING

Other features and advantages of this invention will become apparent in the following detailed description of a preferred embodiment of this invention, with reference to the accompanying drawings, in which.

DETAILED DESCRIPTION OF THE PREFERRED EMBODIMENT

Figure 2:
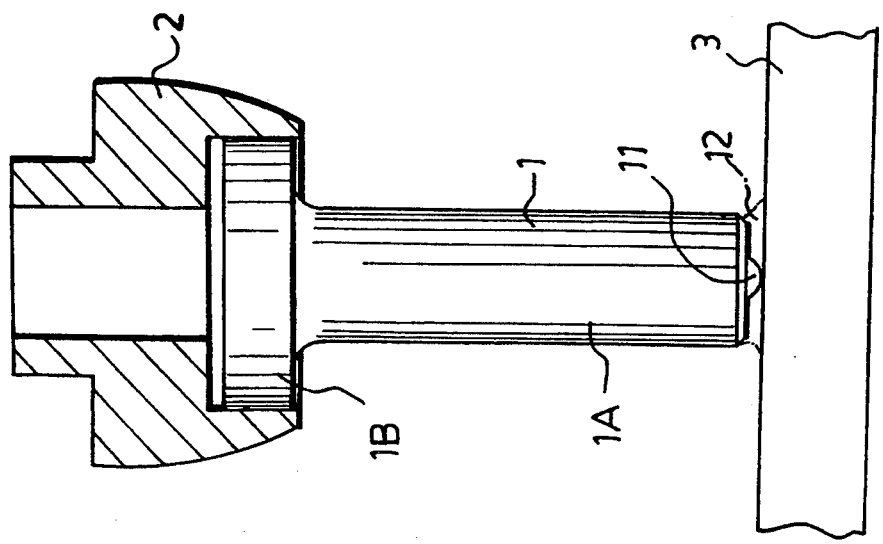
FIG. 2 illustrates how a metal stud is welded to a steel member.
Figure 1:
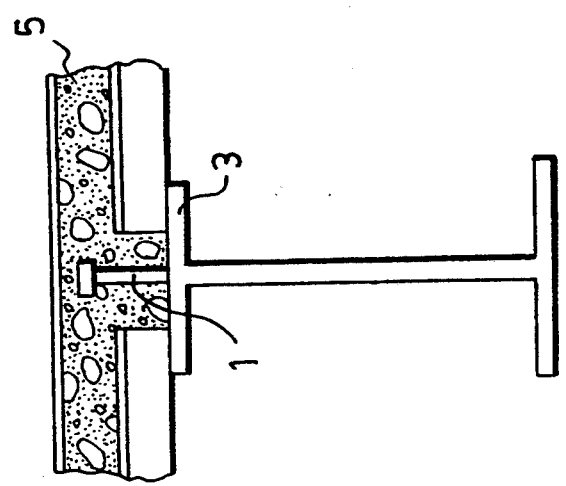
FIG. 1 illustrates how a steel member is coupled with a concrete layer.
Figure 4:
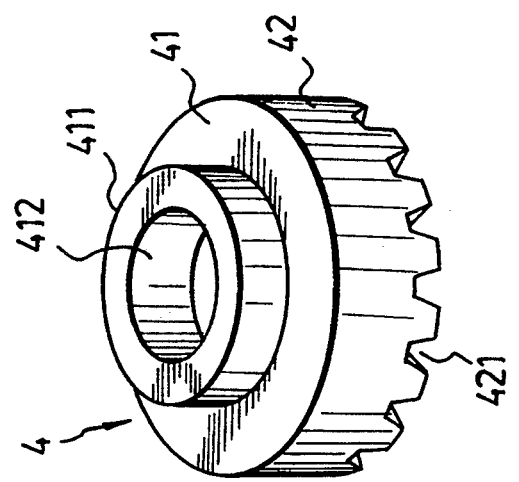
FIG. 4 is a perspective view of an arc shield according to this invention.
Figure 3:
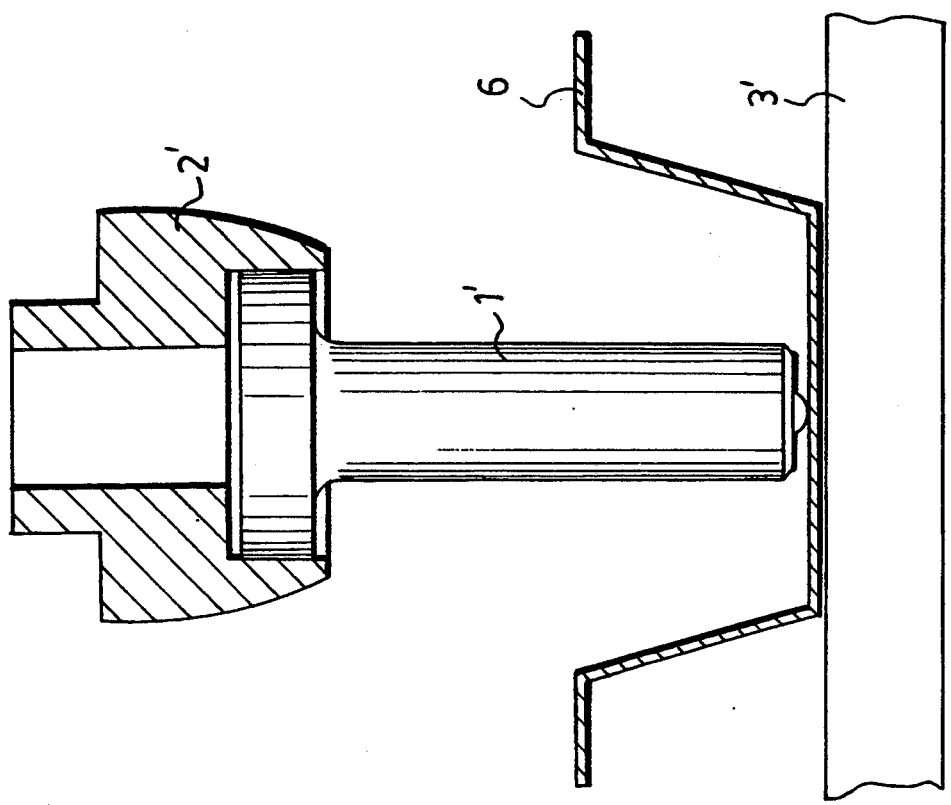
FIG. 3 illustrates how a metal stud is welded to a coupling plate.
Figure 5:
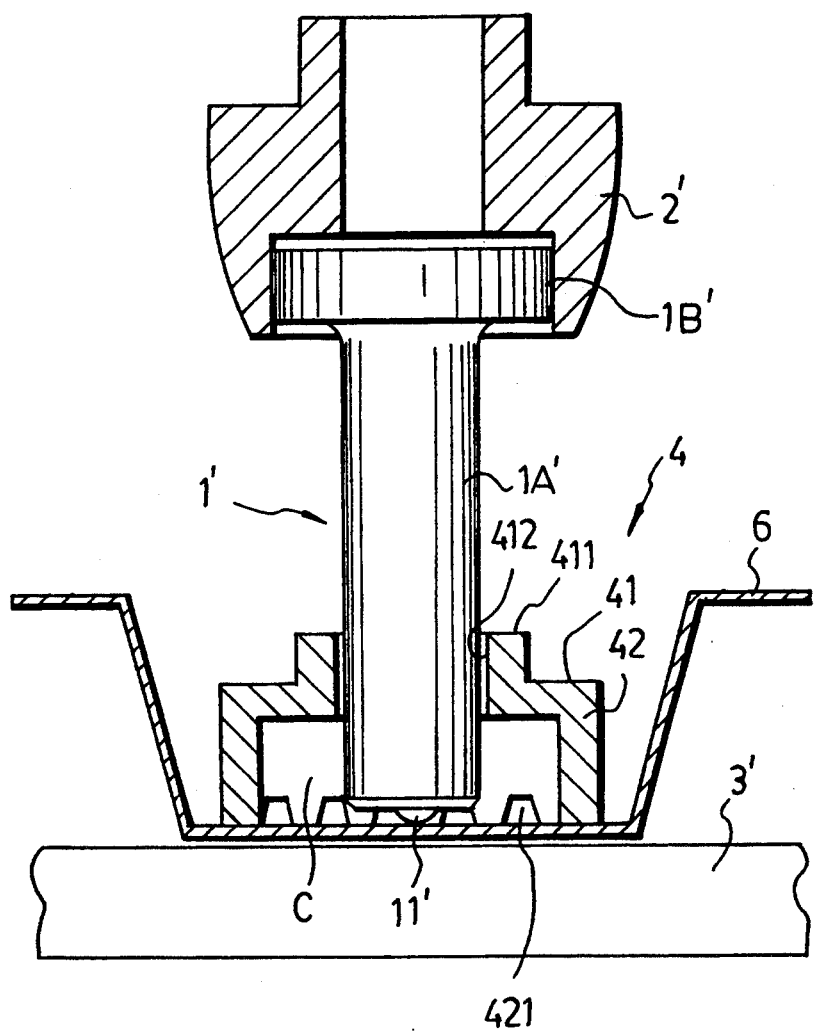
FIG. 5 is a sectional view illustrating the use of the arc shield of this invention.

Referring to FIGS. 4 and 5, an arc shield (4) of this invention is made of metal and includes an annular horizontal top wall (41) and an annular vertical side wall (42) which has an annular top end connected securely to the outer peripheral portion of the top wall (41), and an annular bottom end having twelve trapezoidal notches (421) each of which has a shorter upper side and a longer lower side. An annular neck (411) projects upward from the top wall (41). The side wall (42) defines a cylindrical chamber (C) (see FIG. 5) therein. A hole (412) is formed through the assembly of the top wall (41) and the neck (411) and has a size slightly greater than the diameter of the stem (1A') of a standard metal stud (1') (see FIGS. 3 and 5) so as to allow for extension of the stem (1A') through the hole (412).

Referring to FIG. 5, when the arc shield (4) is used in a so-called "projection welding" process for welding the stud (1') to a metal coupling plate (6), to which a plurality of steel members (3') (only one is shown) are welded, the stem (1A') of the stud (1') is inserted through the hole (412) of the arc shield (4). A generally semicircular metal filler (11'), which is connected securely to the lower end of the stem (1A'), is placed at a selected position on the coupling plate (6) for welding. The head (1B') of the stud (1') is held on a welding gun (2'). When an electric current is applied to the stud (1') from the welding gun (2'), an electric arc is produced between the stud (1') and the lower end of the stem (1A') in the arc shield (4). The arc shield (4) can prevent dust from obtaining access to the molten weld metal formed between the stem (1A') and the coupling plate (6), thus increasing the tensile strength of the solidified weld metal formed between the stem (1A') and the coupling plate (6). The increase in the tensile strength of the solidified weld metal has been proven by a tensile test which has the following experimental data:

| the diameter of the stem of the stud | 13 mm (½") | 16 mm (⅝") | 19 mm (¾") | 22 mm (⅞") |
|---|---|---|---|---|
| minimum load | 5400 kgf (11905 lbf) | 8200 kgf (18078 lbf) | 11600 kgf (25574 lbf) | 15600 kgf (34392 lbf) |
| maximum load | 7400 kgf (16314 lbf) | 11300 kgf (24912 lbf) | 1500 kgf (35053 lbf) | 21300 kgf (46958 lbf) |

When the electric arc melts the weld metal, surplus gas and molten weld metal, which occur in the chamber (C) of the arc shield (4), flow from the arc shield (4) through the notches (421) of the side wall (42). When the gas discharge rate of the notches (421) is too great, it is difficult to solidify the molten weld metal. If the gas discharge rate of the notches (421) is too small, bubbles are easily formed in the solidified weld metal. In this embodiment, each of the notches (421) has an upper side of 4.8 mm, a lower side of 3 mm and a height of 3.3 mm. Total area of the notches (421) is 154.44 mm² which falls in a permissible range.

Because the neck (411) projects from the top wall (41), the hole (412) of the arc shield (4) has a length sufficient to enable accurate positioning of the lower end of the stem (1A') on the coupling plate (6) during the projection welding process.

With this invention thus explained, it is apparent that numerous modifications and variations can be made without departing from the scope and spirit of this invention. It is therefore intended that this invention be limited only as indicated in the appended claims.

I claim:

1. An arc shield for use in projection welding a lower end of a metal stud to an upper surface of a metal plate, said stud having a head and a stem connected securely to a central portion of a lower surface of said head, said arc shield comprising:

an annular horizontal top wall defining a hole therein, and an annular vertical side wall having an annular top end connected securely to an outer peripheral portion of said top wall, and an annular bottom end including twelve trapezoidal notches, said notches being defined by an upper side of approximately 4.8 mm in length, a lower side of approximately 3.0 mm in length and having height of approximately 3.3 mm, said annular side wall defining a chamber therein, said hole of said top wall having a size slightly greater than a diameter of said stem of said stud so as to allow for extension of said stem of said stud into said chamber through said hole of said top wall, whereby, when said projection welding is being performed, electric arc is enclosed within said arc shield, while surplus gas and molten metal produced in said chamber flow from said arc shield through said notches of said annular side wall.

2. An arc shield as claimed in claim 1, wherein said top wall includes an annular neck projecting upward therefrom, said hole being formed through said neck, whereby, length of said hole is increased so as to prevent said stud from moving relative to said metal plate just before welding, thereby enabling accurate positioning of said stud on said metal plate.

* * * * *